US007607130B2

(12) United States Patent
Singh et al.

(10) Patent No.: US 7,607,130 B2
(45) Date of Patent: Oct. 20, 2009

(54) WORKFLOW AS DATA-TRANSITION DRIVEN, SCRIPTABLE STATE MACHINES

(75) Inventors: Kaviraj Singh, Redmond, WA (US); Tudor Toma, Bellevue, WA (US); David C. Johnson, Seattle, WA (US); Scot J. Gellock, Kirkland, WA (US); Joseph P. Fernando, Woodinville, WA (US); Carlos P. Gomes, Redmond, WA (US); Min Wei, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 706 days.

(21) Appl. No.: 10/795,591

(22) Filed: Mar. 8, 2004

(65) Prior Publication Data

US 2004/0172445 A1    Sep. 2, 2004

Related U.S. Application Data

(63) Continuation of application No. 09/346,194, filed on Jul. 1, 1999, now abandoned.

(51) Int. Cl.
G06F 9/46      (2006.01)
G06F 9/455     (2006.01)
G06F 15/16     (2006.01)
G06F 7/00      (2006.01)

(52) U.S. Cl. .................... 718/100; 718/101; 718/102; 709/202; 709/248; 707/1; 707/10; 707/100

(58) Field of Classification Search ............. 718/1, 718/100, 101, 102; 709/202, 248; 707/1, 707/10, 100

See application file for complete search history.

(56) References Cited

U.S. PATENT DOCUMENTS 5,325,505 A    6/1994   Hoffecker et al.

(Continued)

FOREIGN PATENT DOCUMENTS

EP    0335638 B1    9/1996
GB    2319367       5/1998

OTHER PUBLICATIONS

Managing Workflow Using Database Technologies, IBM Technical Disclosure Bulletin, 1996, pp. 199-201, vol. 39-issue 8.

*Primary Examiner*—Van H Nguyen
*Assistant Examiner*—Kenneth Tang
(74) *Attorney, Agent, or Firm*—Workman Nydegger

(57) ABSTRACT

A computing workflow system has a workflow process definition contained in a workflow table as script functions. The workflow table is part of an extended database schema operating with an extended store, a workflow engine and a script engine. The novel workflow system includes a server database having a data table and an associated workflow table. A workflow extended store is communicatively coupled to the server database. A workflow engine is also communicatively coupled to the server database and to the workflow extended store. Further, a script engine is communicatively coupled to the workflow engine. The workflow table includes workflow rules and associated code to be executed by the workflow engine. Each row of the workflow table represents a workflow step. Script functions are defined in the workflow table to evaluate the condition and execute the action of each workflow step. The rules and associated code in the workflow table is both declarative and procedural. The workflow engine compares the data change information from the extended store procedure with the workflow definition in the workflow table and determines the appropriate step that needs to be executed. Then it checks execution permissions on that step. If execute permission is granted, the workflow engine evaluates the workflow step condition against the workflow table and, if true, it executes the step action. Upon completing the step action, the workflow engine commits all the changes made to the current item or to other items in the database.

7 Claims, 8 Drawing Sheets

U.S. PATENT DOCUMENTS

| | | |
|---|---|---|
| 5,331,673 A | 7/1994 | Elko et al. |
| 5,388,254 A | 2/1995 | Betz et al. |
| 5,561,809 A | 10/1996 | Elko et al. |
| 5,765,140 A | 6/1998 | Knudson et al. |
| 5,774,661 A | 6/1998 | Chatterjee et al. |
| 5,799,297 A | 8/1998 | Goodridge et al. |
| 5,878,398 A | 3/1999 | Tokuda et al. |
| 5,999,911 A | 12/1999 | Berg et al. |
| 6,038,541 A | 3/2000 | Tokuda et al. |
| 6,073,109 A | 6/2000 | Flores et al. |
| 6,078,982 A | 6/2000 | Du et al. |
| 6,151,583 A * | 11/2000 | Ohmura et al. ............... 705/8 |
| 6,225,998 B1 | 5/2001 | Okita et al. |
| 6,308,224 B1 | 10/2001 | Leymann et al. |
| 6,311,192 B1 | 10/2001 | Rosenthal et al. |
| 6,349,238 B1 | 2/2002 | Gabbita et al. |
| 6,405,215 B1 * | 6/2002 | Yaung .................... 707/104.1 |
| 6,412,031 B1 | 6/2002 | Grooters |
| 6,430,538 B1 | 8/2002 | Bacon et al. |
| 2002/0038357 A1 | 3/2002 | Haverstock et al. |

\* cited by examiner

| EVENT | DATABASE OPERATION | DESCRIPTION |
|---|---|---|
| 410 — onCREATE | INSERT | IS EXECUTED ONCE PER WORKFLOW INSTANCE, WHEN THE INSTANCE IS CREATED. |
| 420 — onDELETE | DELETE | IS EXECUTED ONCE PER WORKFLOW ITEM WHEN THE INSTANCE IS DELETED. |
| 430 — onCHANGE | UPDATE | IS EXECUTED UPON CHANGING ITEM FIELDS WHILE THE STATUS FIELD REMAINS UNCHANGED. |
| 440 — onENTER | UPDATE | IS EXECUTED UPON ENTERING THE STATE. STATUS FIELD CHANGES FROM ANY TO STATE |
| 450 — onEXIT | UPDATE | IS EXECUTED UPON LEAVING THE CURRENT STATE. STATUS FIELD CHANGES FROM STATE TO ANY |
| 460 — onTRANSITION | UPDATE | IS EXECUTED WHEN THE STATE VALUE CHANGES. |
| 470 — onTIMEOUT | UPDATE | IS EXECUTED ON A TICKER EVENT. A STATE TRANSITION MAY OCCUR. |

FIG. 4

| FIELD | DESCRIPTION |
|---|---|
| 510 — ID | A UNIQUE IDENTIFIER FOR THE ACTION. THIS CAN BE USED TO DETECT LOOPS. |
| 520 — NAME | THE NAME OF THE ACTION. THIS CAN BE USED AS A BUTTON LABEL ON A FORM. |
| 530 — STATE | FOR STATE WORKFLOW STEPS, IT HOLDS THE STATE NAME. FOR TRANSITION WORKFLOW STEPS, IT HOLDS THE INITIAL STATE OF THE TRANSITION. |
| 540 — NextState | FOR STATE WORKFLOW STEPS, IT HOLDS THE STATE EVENT NAME OR NULL FOR STATE-BOUND STEPS. FOR TRANSITION WORKFLOW STEPS, IT HOLDS THE FINAL STATE OF THE TRANSITION:<br>— FOR INSERT AND UPDATE EVENTS, SHOULD MATCH THE NEW VALUE OF THE STATUS FIELD.<br>— FOR DELETE EVENTS THIS FIELD IS NULL.<br>— FOR A SYSTEM EVENT, THIS IS THE NEW VALUE OF THE STATUS FIELD. |
| 550 — EVENT | HOLDS THE NAME OF STATE-BOUND EVENTS, AS LISTED ABOVE IS onTRANSITION FOR TRANSITION-BOUND STEPS. |
| 560 — CONDITION | A SCRIPT EXPRESSION OR FUNCTION THAT EVALUATES TO TRUE OR FALSE. THE FUNCTION CAN BE USED TO VERIFY A COMPLEX CONDITION, SUCH AS CHECKING THE STATUS OR SUB-PROCESSES, OR CHECKING VALUES OF OTHER FIELDS IN THE ROW. (EX. CHECK IF LoanAmoun>$50.) THE WORKFLOW OPERATION SUCCEEDS OR FAILS BASED ON THIS RETURN VALUE. IF NO CONDITION IS REQUIRED THE FIELD IS SET TO NULL. |
| 570 — ACTION | A FUNCTION WHICH IS EXECUTED IF THE CONDITION IS SATISFIED. THE FUNCTION IMPLEMENTS THE ACTIONS THAT SHOULD TAKE PLACE DURING THIS STEP OF THE WORKFLOW. THE FUNCTION SHOULD RETURN EITHER SUCCESS OR AN ERROR CODE. IF NO ACTION IS REQUIRED THE FIELD IS SET TO NULL. |

FIG. 5

| ACTION | STATE | NEXT STATE | PERMISSION | CONDITION | ACTION | MODIFIED FIELDS |
|---|---|---|---|---|---|---|
| SUBMIT | | PENDING | ANYONE | | | STATUS |
| APPROVE | PENDING | APPROVED | LOAN OFFICER 730 | AMOUNT <=100000 | SEND MAIL TO SUBMITTER | STATUS COMMENTS |
| REJECT | PENDING | REJECTED | LOAN OFFICER | AMOUNT >100000 | SEND MAIL TO LOAN MANAGER | STATUS COMMENTS |
| RESUBMIT | REJECTED | PENDING | LOAN MANAGER | | SEND MAIL TO LOAN OFFICER | STATUS COMMENTS |
| DENY | REJECTED | DENIED | LOAN MANAGER | | SEND MAIL TO SUBMITTER | STATUS COMMENTS |

FIG. 7

WORKFLOW AS DATA-TRANSITION DRIVEN, SCRIPTABLE STATE MACHINES

RELATED APPLICATIONS

This application is a continuation of U.S. Ser. No. 09/346,194, filed on Jul. 1, 1999 now abandoned, entitled "Workflow As Data-Transition Driven, Scriptable State Machines". The entirety of which is incorporated herein by reference.

FIELD OF THE INVENTION

This invention relates generally to information systems and more particularly to a computing workflow system having process definition represented in a workflow table.

COPYRIGHT NOTICE/PERMISSION

A portion of the disclosure of this patent document contains material that is subject to copyright protection. The copyright client has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawing hereto: Copyright© 1999, Microsoft Corporation, All Rights Reserved.

BACKGROUND

Workflow processes can be described as a sequence of steps/events resulting in an end solution or product. Some of the steps in the process may involve different parties who play specific roles or provide specific contributions. Each step in the workflow process is generally connected somehow with other steps involved in the process. Some steps may require that specific conditions be met or that other steps have previously been completed. One example of a workflow process includes an assembly line in a factory. In this model each component to the end product is designed to be added to the product at a pre-planned stage. Adding the component at an earlier step may just not make logical sense, or may even interfere with the addition of a later component. Therefore the addition of each component must be coordinated in a sequence of steps that is controlled and which does make sense.

Another everyday example of a workflow process includes making a loan application to a bank. The loan application is submitted to the loan officer and becomes a pending application. Next are a series of conditions which must be met as part of the loan approval process. The conditions include credit checks, income level and so forth compared with the requested loan amount. After initial conditions are met, the loan approval process still requires additional authorization from other parties, such as a loan manager. A loan can only reach an approved state after all of these workflow steps have been completed.

In the age of software, a workflow process can be run by a computer executing a program containing the rules, defined in computer code, for carrying out the steps in the workflow process. These software programs include finite state machines which execute the steps of a workflow process in their pre-planned order. In modern automation, organizational workflow process is classically implemented using computer forms, computer databases, and a multi-tier architecture with relevant computer code running in several locations. The problem with this current method is that the rules, or computer code, for performing the different steps in the workflow process are scattered in multiple locations. The workflow process is thus hindered by the need to locate the appropriate code for a given step and coordinate that computer code's execution with computer code for other steps located in still other places. Under the current system, complex processes requiring a large number of steps are difficult to implement. In some systems the computer code for a single workflow step may be spread among several locations. Therefore, an enormous degree of coherency is lacking. Data may be changed in one place without updating the data records held in another place. Thus different parties with access to the system may in fact see different snap shots of the workflow process in the same instance of time (instance is also a computer code term).

Permissions to execute changes to the data may similarly not be enforced to the extent intended in the workflow processes design. Thus, security and data integrity is usually not guaranteed. Additionally, the scattered nature of the workflow process computer code makes maintaining the system, or even updating the system to account for new parameters, more difficult and frustrating. And, to do so often requires costly, new application program interfaces (apis) and private extensions in order tie together clients, middle tiers of the workflow process, and end databases in the workflow process such as in servers.

SUMMARY

This present invention solves the above described problems associated with workflow. The definition of a state transition diagram is stored in a SQL table called the workflow table. The workflow table is part of an extended database schema operating with an extended store, a workflow engine and a script engine. Each row of the workflow table represents a workflow step. The workflow table includes workflow rules and associated code to be executed by the workflow engine. Script functions are defined to evaluate the condition and to execute the action of each workflow step. The rules and associated code in the workflow table is both declarative and procedural. The workflow engine compares data change information from an extended store procedure with the workflow definition in the workflow table and determines the appropriate step that needs to be executed. Then the workflow engine checks execution permissions on that step. If execute permission is granted, the workflow engine evaluates the workflow step condition against the workflow table and, if true, it executes the step action. Upon completing the step action, the workflow engine commits all the changes made to the current item or to other items in the database.

In one aspect of, the present invention includes a workflow system. The workflow system includes a server database having a data table and an associated workflow table. A workflow extended store is communicatively coupled to the server database. A workflow engine is communicatively coupled to the server database and to the workflow extended store. A script engine communicatively coupled to the workflow engine. The workflow table contains the rules and associated code to be executed by the workflow engine. The workflow engine compares the data change information with the workflow definition in the workflow table.

In the present invention, process definition is kept in the database in one place where tools can access it. This allows a vast body of research and tools development (esp. in the process control industry, e.g. StateCharts) pertaining to state machine composition and decomposition, as well as parallel operation, to be applied when addressing complex processes.

By defining the organizational process computing model on server data transitions, the formal organization process computing model can be implemented without perturbing existing data access and communication paths, eliminating the need for new and private api's that cause costly upgrades. Security is provided by the Windows NT operating system and SQL running in integrated security mode. Data integrity, enforced natively by the database engine, is thus guaranteed.

BRIEF DESCRIPTION OF THE DRAWINGS

FIG. 4 is a table showing the database operation, and a description, for each of the workflow events presented in connection with FIG. 3.

FIG. 5 is a chart illustrating the main status fields, together with their associated descriptions, of a workflow table according to the teachings of the present invention.

FIG. 7 is a workflow table for the loan application workflow process of FIG. 6, according to the teachings of the present invention.

DETAILED DESCRIPTION

In the following detailed description of exemplary embodiments of the invention, reference is made to the accompanying drawings that form a part hereof and, which show by way of illustration, specific exemplary embodiments in which the invention may be practiced. These embodiments are described in sufficient detail to enable those skilled in the art to practice the invention. It is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

The detailed description is divided into three sections. The first section describes the hardware and the operating environment that is suitable for use as a server within the inventive storage system described below. The second section provides a detailed description of the novel workflow process system and provides methods for operating embodiment of the invention. Finally, the third section provides a conclusion of the detailed description.

Hardware and Operating Environment

Figure 1:
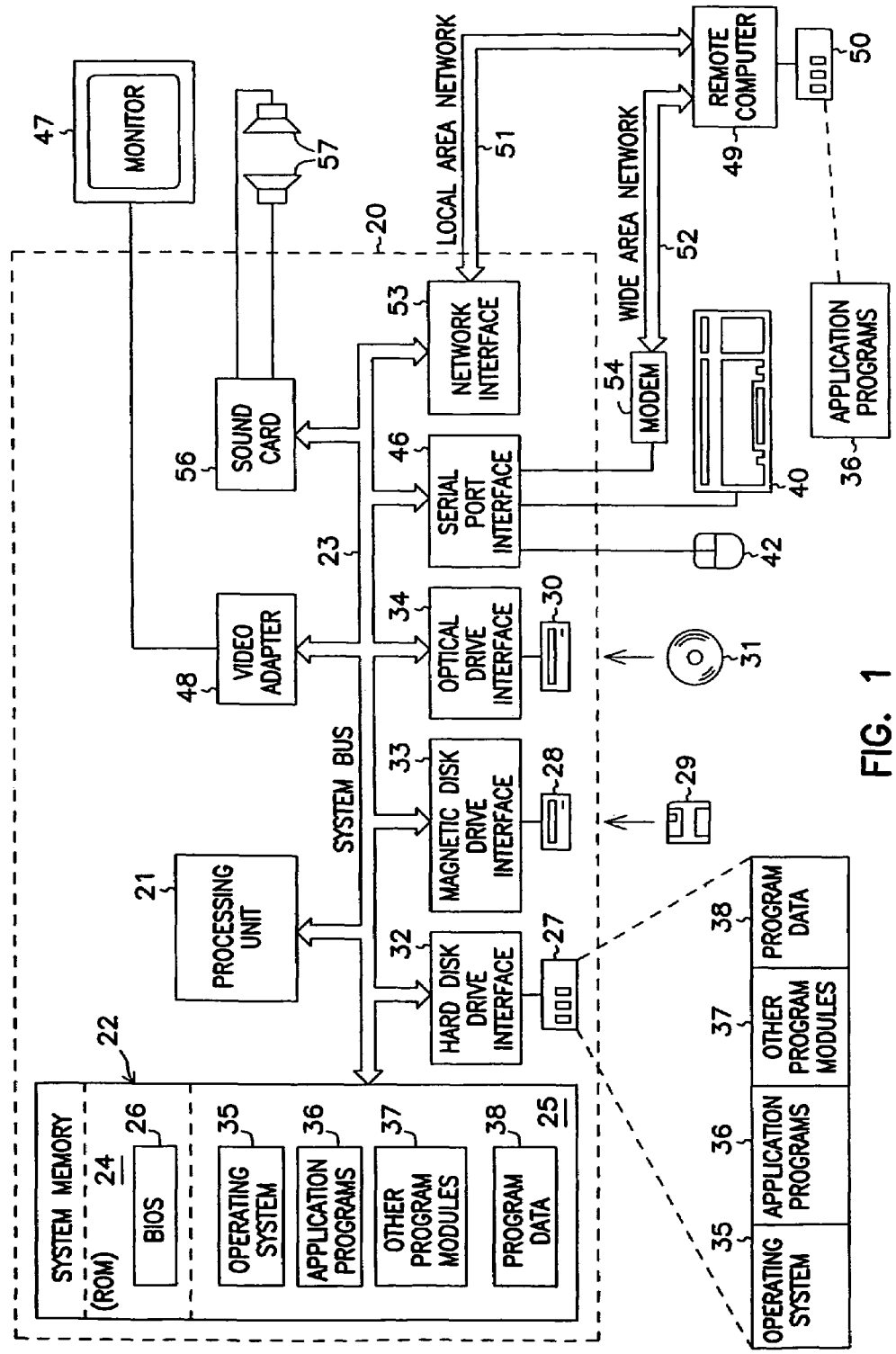
FIG. 1 is a block diagram of the hardware and operating environment of a suitable computer in conjunction with which embodiments of the invention may be practiced.

FIG. 1 provides a brief, general description of a suitable computing environment in which the invention may be implemented. The invention will hereinafter be described in the general context of computer-executable program modules containing instructions executed by a personal computer (PC). Program modules include routines, programs, objects, components, data structures, etc. that perform particular tasks or implement particular abstract data types. Those skilled in the art will appreciate that the invention may be practiced with other computer-system configurations, including hand-held devices, multiprocessor systems, microprocessor-based programmable consumer electronics, network PCs, minicomputers, mainframe computers, and the like which have multimedia capabilities. The invention may also be practiced in distributed computing environments where tasks are performed by remote processing devices linked through a communications network. In a distributed computing environment, program modules may be located in both local and remote memory storage devices.

FIG. 1 shows a general-purpose computing device in the form of a conventional personal computer 20, which includes processing unit 21, system memory 22, and system bus 23 that couples the system memory and other system components to processing unit 21. System bus 23 may be any of several types, including a memory bus or memory controller, a peripheral bus, and a local bus, and may use any of a variety of bus structures. System memory 22 includes read-only memory (ROM) 24 and random-access memory (RAM) 25. A basic input/output system (BIOS) 26, stored in ROM 24, contains the basic routines that transfer information between components of personal computer 20. BIOS 26 also contains start-up routines for the system. Personal computer 20 further includes hard disk drive 27 for reading from and writing to a hard disk (not shown), magnetic disk drive 28 for reading from and writing to a removable magnetic disk 29, and optical disk drive 30 for reading from and writing to a removable optical disk 31 such as a CD-ROM or other optical medium. Hard disk drive 27, magnetic disk drive 28, and optical disk drive 30 are connected to system bus 23 by a hard-disk drive interface 32, a magnetic-disk drive interface 33, and an optical-drive interface 34, respectively. The drives and their associated computer-readable media provide nonvolatile storage of computer-readable instructions, data structures, program modules and other data for personal computer 20. Although the exemplary environment described herein employs a hard disk, a removable magnetic disk 29 and a removable optical disk 31, those skilled in the art will appreciate that other types of computer-readable media which can store data accessible by a computer may also be used in the exemplary operating environment. Such media may include magnetic cassettes, flash-memory cards, digital versatile disks, Bernoulli cartridges, RAMs, ROMs, and the like.

Program modules may be stored on the hard disk, magnetic disk 29, optical disk 31, ROM 24 and RAM 25. Program modules may include operating system 35, one or more application programs 36, other program modules 37, and program data 38. A user may enter commands and information into personal computer 20 through input devices such as a keyboard 40 and a pointing device 42. Other input devices (not shown) may include a microphone, joystick, game pad, satellite dish, scanner, or the like. These and other input devices are often connected to the processing unit 21 through a serial-port interface 46 coupled to system bus 23; but they may be connected through other interfaces not shown in FIG. 1, such as a parallel port, a game port, or a universal serial bus (USB). A monitor 47 or other display device also connects to system bus 23 via an interface such as a video adapter 48. In addition to the monitor, personal computers typically include other peripheral output devices (not shown) such as speakers and printers. In one embodiment, one or more speakers 57 or other audio output transducers are driven by sound adapter 56 connected to system bus 23.

Personal computer 20 may operate in a networked environment using logical connections to one or more remote computers such as remote computer 49. Remote computer 49 may be another personal computer, a server, a router, a network PC, a peer device, or other common network node. It typically includes many or all of the components described above in connection with personal computer 20; however, only a storage device 50 is illustrated in FIG. 1. The logical connections depicted in FIG. 1 include local-area network (LAN) 51 and a wide-area network (WAN) 52. Such networking environments are commonplace in offices, enterprise-wide computer networks, intranets and the Internet.

When placed in a LAN networking environment, PC 20 connects to local network 51 through a network interface or adapter 53. When used in a WAN networking environment such as the Internet, PC 20 typically includes modem 54 or other means for establishing communications over network 52. Modem 54 may be internal or external to PC 20, and connects to system bus 23 via serial-port interface 46. In a networked environment, program modules, such as those comprising Microsoft® Word which are depicted as residing within 20 or portions thereof may be stored in remote storage device 50. Of course, the network connections shown are illustrative, and other means of establishing a communications link between the computers may be substituted.

Software may be designed using many different methods, including object oriented programming methods. C++ and Java are two examples of common object oriented computer programming languages that provide functionality associated with object oriented programming. Object oriented programming methods provide a means to encapsulate data members (variables) and member functions (methods) that operate on that data into a single entity called a class. Object oriented programming methods also provide a means to create new classes based on existing classes.

An object is an instance of a class. The data members of an object are attributes that are stored inside the computer memory, and the methods are executable computer code that act upon this data, along with potentially providing other services. The notion of an object is exploited in the present invention in that certain aspects of the invention are implemented as objects in one embodiment.

An interface is a group of related functions that are organized into a named unit. Each interface may be uniquely identified by some identifier. Interfaces have no instantiation, that is, an interface is a definition only without the executable code needed to implement the methods which are specified by the interface. An object may support an interface by providing executable code for the methods specified by the interface. The executable code supplied by the object must comply with the definitions specified by the interface. The object may also provide additional methods. Those skilled in the art will recognize that interfaces are not limited to use in or by an object oriented programming environment.

System Level Overview

Figure 6:
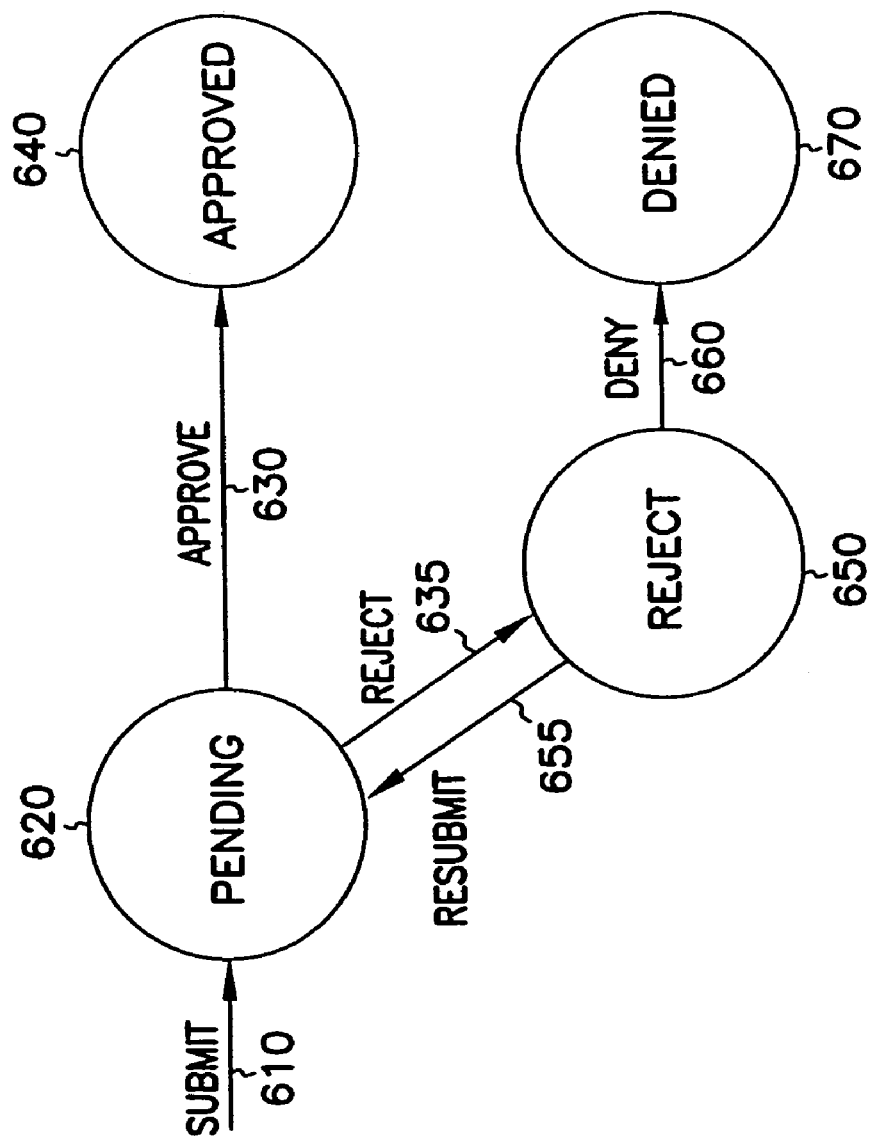
FIG. 6 is a state transition diagram for a loan application workflow process.

A workflow process is made up of a sequence of state transitions which can be modeled in a state transition diagram. An example of a state transition diagram for a typical loan application process is shown in FIG. 6. In the loan application scenario, examples of state transitions include adding a loan application to a pending state, moving the loan application along to the approval state, or alternatively moving the loan application to a rejected state. Each state transition may require one or many workflow steps. Again in the loan scenario, the steps required for moving the loan application from the pending state to an approved state or rejected state may include checking the credit history of the loan applicant, assessing the amount of the loan request, and verifying the income level of the loan applicant. Each workflow step is triggered by a workflow event.

Thus, a novel workflow architecture has been developed which works with data stored in SQL databases or any database comprising a rich event model. The definition of a state transition diagram is stored in a SQL table called the workflow table. The workflow table is part of an extended database schema operating with an extended store, a workflow engine and a script engine. Each row of the workflow table represents a workflow step and holds all the information necessary to complete the step. The workflow table includes workflow rules and associated code to be executed by the workflow engine. Script functions are defined to evaluate the condition and to execute the action of each workflow step. The rules and associated code in the workflow table is both declarative and procedural. The workflow engine compares data change information from an extended store procedure with the workflow definition in the workflow table and determines the appropriate step that needs to be executed. Then the workflow engine checks execution permissions on that step. If execute permission is granted, the workflow engine evaluates the workflow step condition against the workflow table and, if true, it executes the step action. Upon completing the step action, the workflow engine commits all the changes made to the current item or to other items in the database.

The workflow architecture provides a more efficient method for tracking workflow process applications in that all of the logic or process definition, which controls the workflow, is contained in one unique location where tools can access it.

Figure 2:
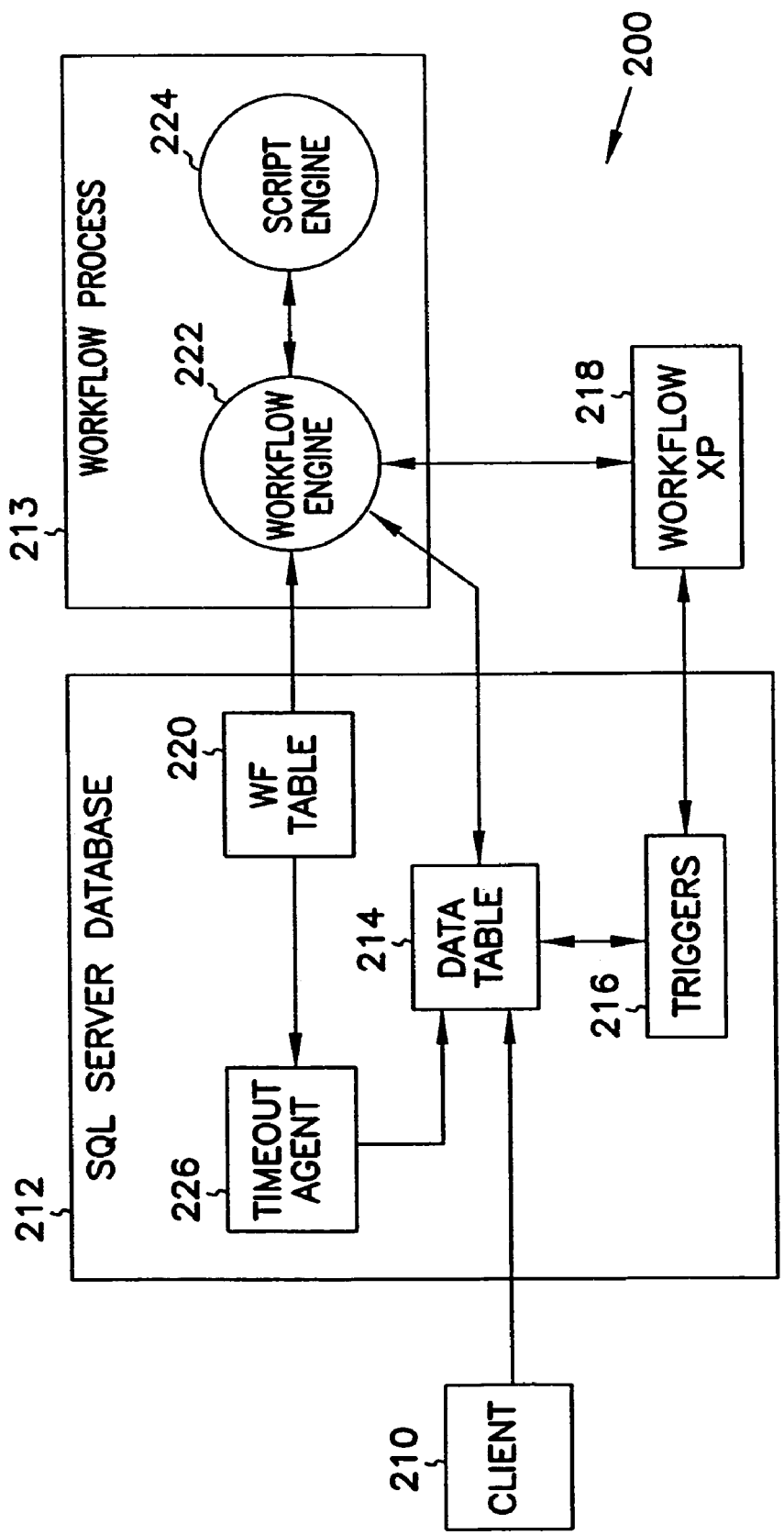
FIG. 2 is a block diagram of a workflow architecture according to the teachings of the present invention.

FIG. 2 illustrates the novel workflow architecture 200 according to the teachings of the present invention. As shown in FIG. 2, the workflow architecture includes a workflow client 210 that is communicatively coupled to a server database 212, e.g. an SQL server database 212. Throughout this application, components which are communicatively coupled are linked via hardwired electronic circuitry or wireless systems, including both physical and logical connections, suitable for transmitting electronic data between the two components. The components themselves generally include application program interfaces which define how the components will communicate electronic data between one another. The server database 212 includes a data table 214 that is workflow enabled. Each time data is to be modified in the data table 214, the data table 214 calls workflow triggers 216 which are defined in the data table 214. The triggers 216 are communicatively coupled to a workflow extended store 218. The triggers 216 analyze the data change information and then invoke an appropriate extended store procedure from the workflow extended store 218.

A workflow table 220 associated with the workflow enabled data table 214 is included in the SQL server database 212. The workflow table 220 is communicatively coupled to a workflow engine 222 as is the data table 214. The workflow table 220 includes workflow rules and associated code to be executed by the workflow engine 222. Each time data is to be modified in the data table 214, a copy of the workflow table 220 is loaded into the workflow engine 222. In one embodiment, the workflow engine 222 is implemented as a COM component and can run both in-process and out-of-process with the server 212.

The workflow extended store 218 is also communicatively coupled to the workflow engine 222. When the triggers 216 invoke an extended store procedure in the workflow extended store 218, the extended store procedure calls the workflow engine 222. The extended store procedure also creates a session object that is available in scripting code in order to provide run time context information to the workflow engine 222.

The workflow engine 222 is communicatively coupled to a script engine 224. The workflow engine 222 invokes the script engine 224 and compares the data change information with the workflow definition contained in the copy of the workflow table 220 that has been loaded into the workflow engine 222. The workflow engine 222 determines the appropriate step that needs to be executed. Then the workflow engine 222 checks execution permissions on that step. If execute permission is granted, the workflow engine 222 evaluates the step condition and, if true, executes the step action. Both the condition and action are defined by script functions. As an example of this embodiment, the script functions can be written in VBScript™ or JavaScript™. The script functions are executed by the script engine 224 once invoked by the workflow engine 222. Upon completing the step action, the workflow engine 222 commits all the changes made to the current item or to other items in the data table 214.

The server database 212 further includes a timeout agent 226 which is implemented as a SQL job. The timeout agent 226 is scheduled to run with a frequency defined by a server administrator. The timeout agent 226 scans all the databases on the server 212 and executes timeout workflow events as due. The timeout agent 226 is communicatively coupled to both the data table 214 and the workflow engine 222. For timeout events that define a state transition, the timeout agent 226 performs the update in the data table 214 and triggers an associated workflow action in the workflow engine 222.

Workflow Events

Figure 3:
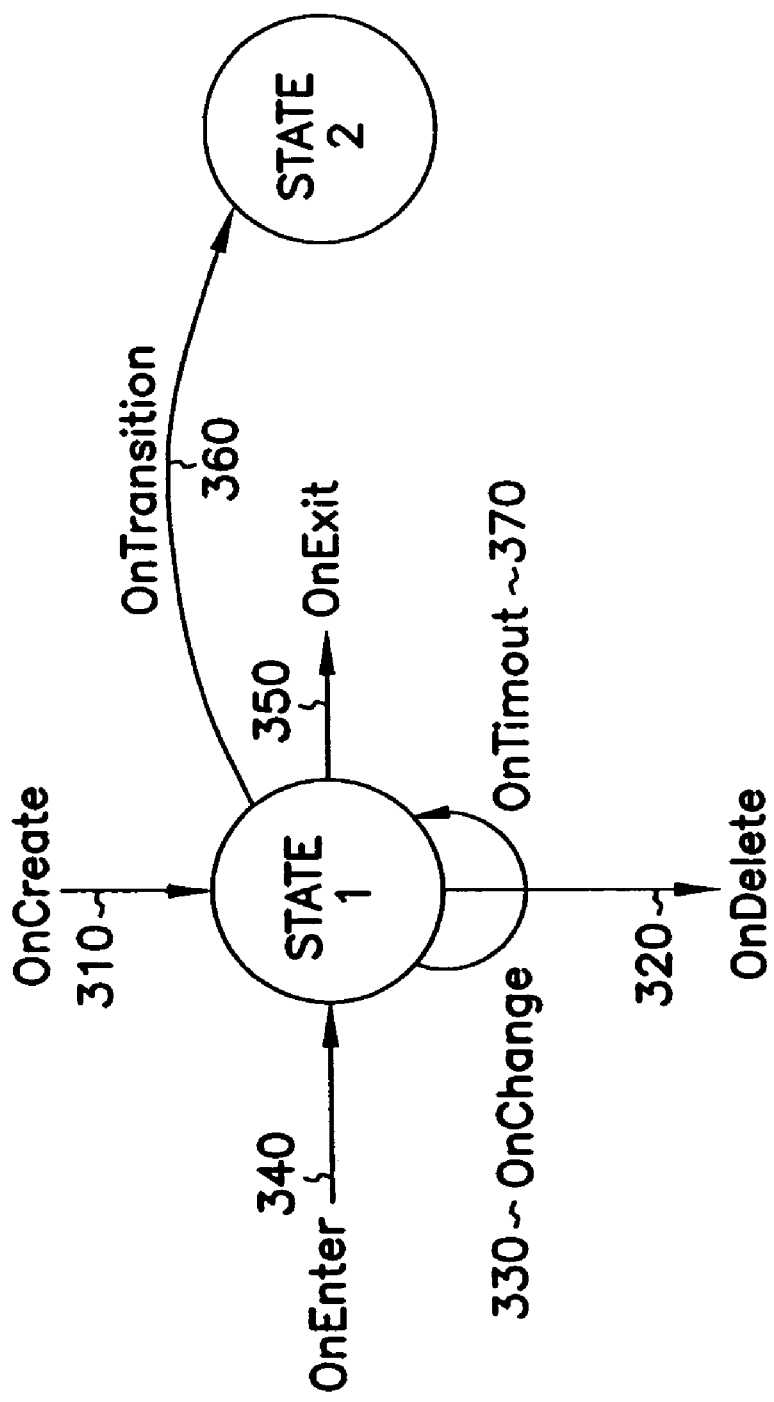
FIG. 3 is a workflow events diagram according to the teachings of the present.

FIG. 3 is an embodiment of an events diagram 300 according to the teachings of the present invention. According to the present invention, there are three types of workflow events; state events, transition events, and timeout events. Each type of event is represented in FIG. 3. In FIG. 3, the state events include; On Create 310, On Delete 320, On Change 330, On Enter 340, and On Exit 350. In FIG. 3, the transition event is shown as 360 between STATE 1 and STATE 2. The timeout event is represented at 370.

State events are associated with a single workflow state. State events are executed every time the event associated with a state is triggered. The firing of those events depends on how a state is entered or exited. State-bound events are transition-agnostic, i.e. they don't depend on where the workflow is coming from or what state it is going to. State events do not call each other.

Transition events are associated with a change from a current state to a new state. The current state and the next state are included in the definition of a workflow step. The transition event is executed upon a requested state transition when the current and the new workflow state match the definition of one of the workflow steps. Transition-bound events are the primary way to implement the state transition diagram.

Timeout events are associated with a timeout job produced by the timeout agent described in FIG. 2. The timeout event can be either a state event or a transition event. The timeout event is triggered by the timeout job.

FIG. 4 is a workflow event table 400 illustrating each of the above described workflow events, the associated database operation, and its description. As shown in FIG. 4, the On Create 410 event is associated with the Insert database operation. This operation is executed once per workflow instance, when the instance is created. The On Delete 420 event is associated with the Delete database operation. This operation is executed once per workflow item when the instance is deleted. The On Change 430 event is associated with the Update database operation. This operation is executed upon changing item fields while the status field remains unchanged. On Enter 440 is similarly associated with the Update database operation. This operation is executed upon entering a given workflow state. According to the teachings of the present invention, the status field on the client of FIG. 2, changes from Any to State. On Exit 450 is also associated with the Update database operation. This operation executed upon leaving the current workflow state. According to the teachings of the present invention, the status field on the client of FIG. 2 changes from State to Any.

The On Transition 460 event is associated with the Update database operation. Here, the Update database operation is executed when the state value changes. Lastly, the On Timeout 470 event is associated with the Update database operation. This operation is executed at a scheduled frequency defined by a server administrator and controlled by the timeout agent, as described in connection with FIG. 2. For timeout events that define a state transition, the timeout agent performs the update in the data table and triggers the associated workflow action.

FIG. 5 is an illustration of an embodiment of the main status fields of a workflow table with their associated descriptions 500. For each data table that needs to be workflow-enabled an associated workflow table is defined to enforce the integrity of data changes. An application may have many workflow tables, one for each workflow enabled data table. The workflow table contains rules and associated code to be executed by a workflow engine, as shown and described in detail in connection with FIG. 2. A status column in the data table of the server shown in FIG. 2 holds workflow states. The status column drives the workflow process for that particular data table. The values in the status column (i.e., the workflow states) come from a finite set of values, usually defined by a lookup table. All the relationships between data tables, workflow tables, status columns and lookups are stored in a couple of extended schema tables created for a particular application which extend the SQL system tables with workflow information.

As explained in connection with FIG. 2, input to a workflow client creates client events which may request data changes to a data table in a server. The workflow for a particular application is driven by these client events. Every time a data change to the data table is requested, the workflow engine is invoked to enforce transition rules. The rules that govern data changes can be specified in both declarative and procedural form. The definition of a state transition diagram is stored in a SQL table called the workflow table 500. Each row of the workflow table represents a workflow step. Script functions are defined to evaluate the condition and to execute the action of each workflow step. The dual representation of these rules as declarative and procedural combines an ease of workflow definitions with the power of scriptable actions.

As stated, FIG. 5 is an embodiment illustrating the status fields of a workflow table and their associated description 500 as part of a workflow process according to the teachings of the present invention. According to FIG. 5, the status fields of a workflow table include a first status field, ID 510. Here, a unique identifier for a given workflow action in a workflow process is received. The ID status field 510 can be used to detect loops in the workflow process.

The status fields in the workflow table include a second status field, Name status field 520. The Name status field receives 520 receives the name for the workflow action. In this manner, the name can be used as a button label on a form print-out. A State status field is included at 530 as a third status field. For state workflow steps, the State status field 530 holds the state name. For transition workflow steps, the State status field holds the initial state of the transition. A NextState status field 540 is included as a fourth status field. For state workflow steps, the NextState status field 540 holds the state event name or NULL for state-bound workflow steps. For transition workflow steps, the NextState status field 540 holds the final state of the transition. When the database operation associated with the state event is Insert or Update the new value for the NextState status field submitted on the client must match the value presently held in the NextState status field 540. When, the database operation associated with the state event is Delete the NextState status field 540 is NULL.

When the database operation is associated with an OnTimeout event, the NextState status field 540 should match the new value for the NextState status field 540 sent by the timeout agent located on the server.

An Event status field is provided at 550 as a fifth status field. The Event status field 550 holds the name of state-bound events as described above in detail in connection with FIG. 4. Similarly, for transition bound steps, the Event status field 550 holds the On Transition event name. The workflow table 500 includes a Condition status field 560. The Condition status field 560 contains a script expression or function that evaluates to the workflow step condition to either True or False. The workflow operation succeeds or fails based on this return value. The function can be used to verify a complex condition. In example, the function can be used to check the status of sub-processes, or to check values of other status fields in the workflow table row. If no condition is required the Condition status field 560 is set to NULL.

Finally, an Action status field is provided at 570 as a seventh status field. The Action status field 570 holds a function which is executed if the condition in the above described Condition status field 560 is satisfied. The function in the Action status field 570 implements the actions that should take place during the current workflow step. The function should return either success or an error code. If no action is required the Action status field 570 is set to NULL.

FIG. 6 illustrates an embodiment of a state transition diagram for a loan application workflow process according to the teachings of the present invention. As shown in FIG. 6, a loan application is submitted at 610. The loan application then goes into a pending state at 620. The loan application can then be approved at 630 or rejected at 635, thus introducing a branch in the workflow process. If the loan application is approved it will go into an approved state shown at 640. If the loan application is rejected it will go into a reject state at 650. From reject state 650, the loan application can be resubmitted at 655, and thus return to the pending state 620, or the loan application can be denied at 660. If the loan application is denied it will go into a denied state at 670.

FIG. 7 is an illustration of an associated workflow table 700 for the loan application workflow process of FIG. 6. The workflow table 700 includes workflow rules and associated code to be executed by the workflow engine. The workflow engine compares the data change information with the workflow definition in the workkflow table and determines the appropriate step that needs to be executed. Each row of the workflow table 700 represents a workflow step. The columns of the workflow table represent the main status fields for the workflow table 700. The workflow table 700 defines the valid state transitions for the example loan application workflow process. The workflow table 700 also defines permissions that control what can effect each transition. The workflow table 700 of FIG. 7 provides an example of a simple, linear workflow process for the loan application workflow system.

At workflow step 710, a loan application is submitted as the workflow action. Here the workflow engine will have compared the data change information with the workflow definition in the workflow table to determine that the appropriate step for this workflow action is 710. Initially the State status field in the workflow table is NULL and the NextState status field holds the final state, here PENDING, for a transition workflow step. At this point a series of workflow events would take place including On Enter and On Exit in order to update the State status field in the workflow table 500 from NULL to a newly received state. If the new value received for the State status field matches the value of the NextState status field, e.g. PENDING, then an On Transition workflow event would occur to Update the database and change the State status field to PENDING. If the new value received for the State status field did not match the value of the NextState status field, then the function of the Action status field will return an error code.

At workflow step 720, an approve action request is received as the workflow action. Initially the State status field in the workflow table is PENDING and the NextState status field holds the final state, here APPROVED, for a transition workflow step. At this point a series of workflow events would again take place including On Enter and On Exit in order to update the State status field in the workflow table from PENDING to a newly received state. The workflow engine, having a copy of the workflow table and the extended store procedure, operates in conjunction with the scripting engine, as described and explained in detail in connection with FIG. 2. The workflow engine will use the script engine to evaluate the expressions and script functions defined in the workflow table to determine the appropriate step that needs to be executed. Thus, the workflow engine will compare the data change information with the workflow definitions contained in the workflow table. The workflow engine will use the workflow table to check execution permissions as part of a workflow step. As shown at 730, an execution permission is required from a loan officer as part of workflow step 720. In FIG. 7, a condition is associated with the approve action request of workflow step 720. In this embodiment, a script expression or function requires that the loan request amount be equal to or less than $100,000. If this workflow step condition is True, then the workflow engine proceeds to execute on the workflow step action. If the workflow step condition is False, then the workflow engine will return an error code and can use the workflow table to proceed to a reject workflow step, shown in FIG. 7 at 740.

A number of workflow support functions are included as part of the workflow process of the present invention. These workflow support functions use the definitions in the workflow table and the extended store procedure in conjunction with the workflow engine and the scripting engine. The workflow support functions include a core set of functions that use the Session Object created by the extended store and implement a number of workflow process related tasks. As shown at 750, the workflow process related tasks can include sending mail, or email, to a submitter. Similarly, at 760, the workflow process related tasks can include sending mail, or email, to a loan officer.

As will be understood by one of ordinary skill in the art upon reading this disclosure, the other workflow steps, shown at 770 and 780 in the workflow table of FIG. 7, operate in an analogous fashion to those described above in connection with workflow steps 710 and 720.

Figure 8:
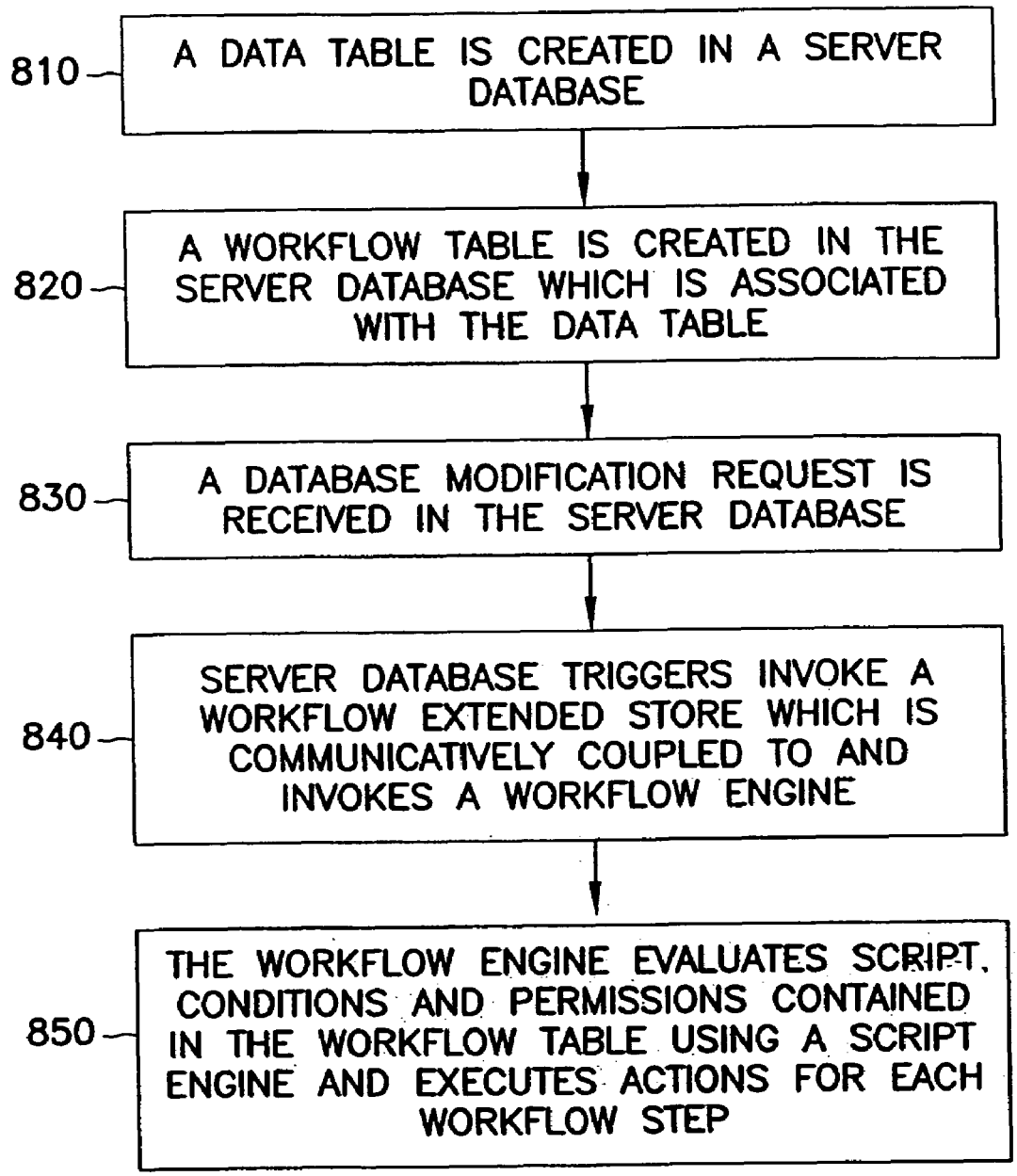
FIG. 8 illustrates, in flow diagram form, an embodiment of a method for a workflow process according to the teachings of the present invention.

FIG. 8 illustrates, in flow diagram form, an embodiment of a method for a workflow process according to the teachings of the present invention. This method can be performed by the workflow system described above. The method constitutes computer programs made up of computer-executable instructions. Describing the methods by reference to a flowchart enables one skilled in the art to develop such programs including such instructions to carry out the method on suitable computing systems from computer-readable media. In FIG. 8, a data table is created in a server database at 810. A workflow table is created in the server database which is associated with the data table 820. The workflow table includes workflow rules and associated code to be executed by the workflow engine. Each row in the workflow table represents a workflow step. A data modification request is received by the data table in the server database 830. Server database triggers, defined in the data table, invoke a workflow extended store which is communicatively coupled to and invokes a workflow engine 840. The workflow engine receives a copy of the workflow table containing rules and associated codes for data modification request. The workflow engine then evaluates script conditions and permission contained in the workflow table using a script engine and executes actions for each workflow step 850. The script engine is communicatively coupled to and invoked by the workflow engine.

CONCLUSION

A computing workflow system and methods have been described in which workflow process definition is contained in a workflow table as script functions. The workflow table is part of an extended database schema operating with an extended store, a workflow engine and a script engine.

By defining the organizational process computing model on server data transitions, the formal organization process computing model can be implemented without perturbing existing data access and communication paths, eliminating the need for new and private api's that cause costly upgrades. Security is provided by the Windows NT operating system and SQL running in integrated security mode. Data integrity, enforced natively by the database engine, is thus guaranteed.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. Therefore, is manifestly intended that this invention be limited only by the following claims and equivalents thereof.

We claim:

1. A workflow system embodied on a computer-readable storage medium, comprising:
   a workflow enabled data table that includes workflow triggers;
   a workflow table that includes workflow rules and associated code;
   a workflow extended store coupled to the workflow enabled data table and the workflow table, the workflow extended store includes extended store procedures;
   a workflow engine coupled to the workflow enabled data table, the workflow table and the workflow extended store; and
   a script engine coupled to the workflow engine;
   wherein the workflow enabled data table and the workflow table are part of a database server, the database server including at least one timeout agent implemented as a server job, the at least one timeout agent scans the database server and executes at least one timeout workflow event when the database server indicates such a workflow event is due.

2. The workflow system of claim 1, the at least one timeout agent coupled to the workflow enabled data table and to the workflow engine.

3. The workflow system of claim 1, the at least one timeout agent scheduled to run with a definable frequency.

4. The workflow system of claim 1, the workflow triggers analyze a data modification request submitted to the workflow enabled data table.

5. The workflow system of claim 4, the workflow triggers invoke an extended store procedure.

6. The workflow system of claim 1, the workflow engine executes the workflow rules and associated code.

7. The workflow system of claim 1, the workflow engine invokes the script engine.

* * * * *